United States Patent [19]

Thurman et al.

[11] Patent Number: 5,181,375
[45] Date of Patent: Jan. 26, 1993

[54] METHOD FOR PRODUCING STEEL ALLOY GEARS

[75] Inventors: Dan L. Thurman; Melvin B. Slane, both of Peoria; Charles F. Bernd, Pekin; John A. Olszewski, Plainfield, all of Ill.

[73] Assignee: Caterpillar Inc., Peoria, Ill.

[21] Appl. No.: 670,633

[22] Filed: Mar. 18, 1991

[51] Int. Cl.$^5$ .............................................. B24B 1/00
[52] U.S. Cl. ........................................ 51/287; 51/322
[58] Field of Search ............... 51/281 R, 287, 322, 51/323, 324; 148/13, 16, 16.5, 16.6, 134, 141, 316–319, 12.4; 409/12, 13, 26, 51, 66, 84, 131, 244, 293

[56] References Cited

U.S. PATENT DOCUMENTS

| | | | |
|---|---|---|---|
| 3,368,263 | 2/1968 | Harris, Jr. | 51/287 |
| 3,385,739 | 5/1968 | Danis | 148/316 X |
| 3,398,444 | 8/1968 | Nemy | 148/16.5 |
| 3,921,338 | 11/1975 | Kedrinsky et al. | 51/33 |
| 4,119,443 | 10/1978 | Abe et al. | 148/318 X |
| 4,173,501 | 11/1979 | Hildebrandt et al. | 148/16.5 |
| 4,373,973 | 2/1983 | Cellitti et al. | 148/12.4 |
| 4,559,744 | 12/1985 | Wirz | 51/287 |
| 4,635,404 | 1/1987 | Wirz | 51/105 |
| 4,649,671 | 3/1987 | Erhardt et al. | 51/287 |
| 4,761,867 | 8/1988 | Vollmer et al. | 29/159 |
| 4,921,025 | 5/1990 | Tipton et al. | 148/16.5 |

OTHER PUBLICATIONS

Kapp sales literature entitled "External Gear Grinding Machine VAS-5" published Aug., 1989.
General Electric paper delivered at SME Second International Grinding Conference on Jun. 10–12, 1986 entitled "Beneficial Compressive Residual Stress REsulting From CBN Grinding".
Technical Paper by Gary J. Kimmet, published by American Gear Manufacturers Association, entitled "CBN Finish Grinding of Hardened Spiral Bevel And Hypoid Gears", copyright 1985.
SME Technical Paper, entitled "Technological Fundamentals of CBN Bevel Gear Finish Grinding", dated 1985.

Primary Examiner—Bruce M. Kisliuk
Assistant Examiner—John A. Marlott
Attorney, Agent, or Firm—Robert E. Muir; Steven R. Janda

[57] ABSTRACT

A method for producing steel alloy gears comprises the steps of providing a gear with a shape in which its tooth surfaces have excess material requiring subsequent removal; grinding the gear's tooth root and flank surfaces to a final finish shape; and subsequently performing a final heat treat to the ground gear to provide a hardened surface layer extending at least to a minimum depth required by the function of the gear. The grinding is advantageously accomplished by cubic boron nitride grinding. The final heat treat is controlled so that the hardened surface layer extends to a depth not substantially greater than the minimum depth required by the function of the gear. The final heat treat also relieves stresses caused by the preceding steps and also imposes beneficial stresses.

8 Claims, 3 Drawing Sheets

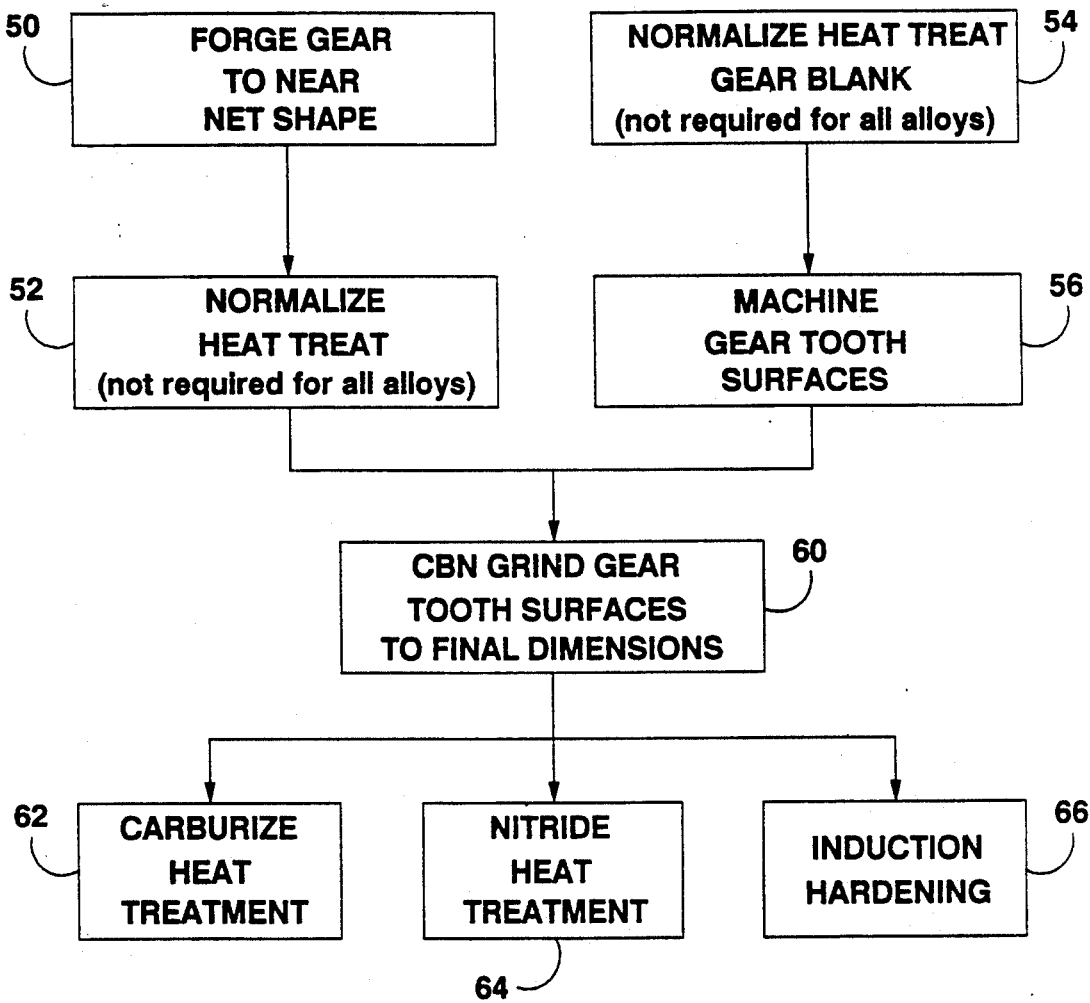
Fig_1_

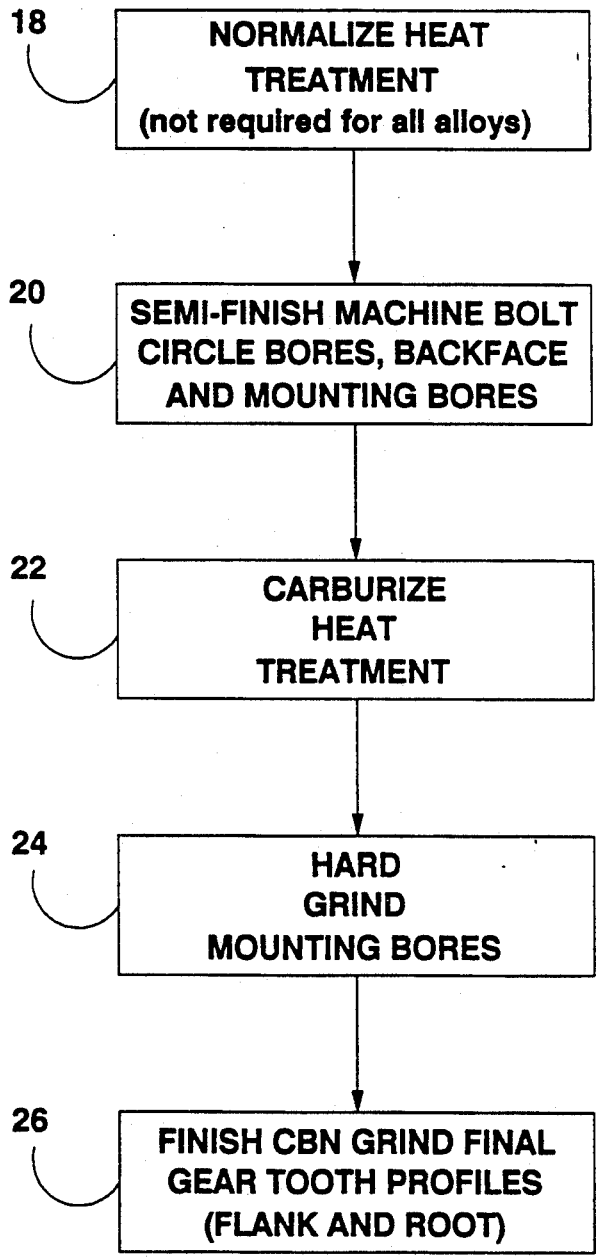
Fig_2_
PRIOR ART

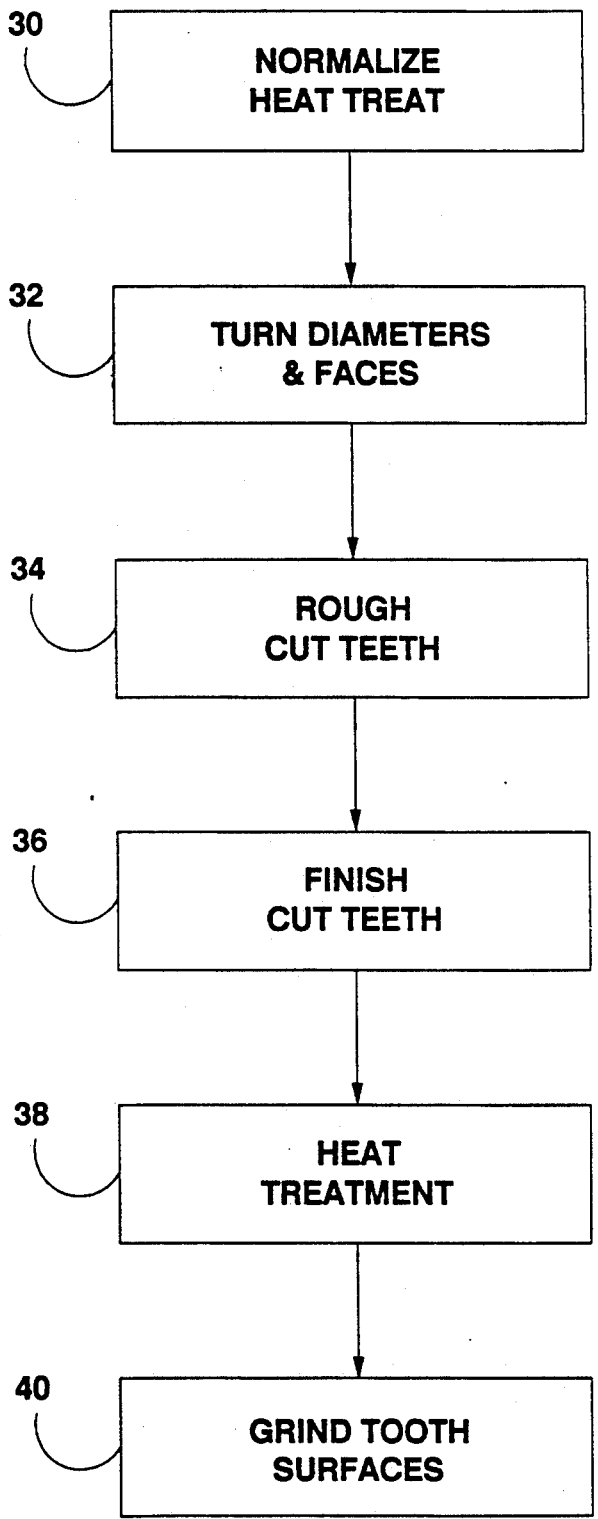
Fig_3_
PRIOR ART

METHOD FOR PRODUCING STEEL ALLOY GEARS

TECHNICAL FIELD

This invention relates generally to the art of metal working and more particularly to a method especially adapted for making gears.

BACKGROUND ART

In the typical gear production facility precision cutting of gear teeth is followed by heat treatment to harden the gears. The heat treatment often distorts the gears. Some types of gears are lapped as pairs after heat treatment to refine the tooth contact areas. Where high quality gears are necessary, final finishing is done after hardening by conventional grinding operations. American Gear Manufacturers Association Technical Paper No. 84FTM6, entitled "CBN Finish Grinding of Hardened Spiral Bevel and Hypoid Gears", by Gary J. Kimmet and published in 1985, discloses the use of cubic boron nitride (CBN) grinding for final finishing after hardening.

U.S. Pat. No. 4,761,867 of Vollmer et al., issued Aug. 9, 1988, discloses a method for producing ring gears in which a near net shape ring gear has its tooth surfaces cubic boron nitride ground after carburize heat treatment. This requires the grinding operation to be performed on a hardened surface and, while cubic boron nitride grinding reduces the potential for grinder burn, the problem still exists. Further, because this process requires metal removal after the heat treat operation, it is necessary to form a hardened depth that is thick enough to allow the required depth to remain after the grinding operation.

That patent also discloses as prior art the well known method of making a gear by cutting (i.e. machining) operations prior to heat treat. Typically the cutting operations include both rough and finish cuts; however the so-called finish cut introduces stresses which vary over the tooth surfaces. Those stresses contribute to heat treat distortions. In the prior art some gears are used "as is" after heat treatment, some are lapped, and some are ground.

The present invention is directed to overcoming one or more of the disadvantages described above.

DISCLOSURE OF THE INVENTION

In accordance with the present invention there is provided a method for producing steel alloy gears comprising the steps of providing a gear with a shape in which its tooth surfaces have excess material requiring subsequent removal; grinding the gear's tooth root and flank surfaces to a final finish shape; and subsequently performing a final heat treat to the ground gear to provide a hardened surface layer extending at least to a minimum depth required by the function of the gear.

Advantageously the step of grinding is accomplished by cubic boron nitride grinding.

Advantageously the final heat treat is controlled so that the hardened surface layer extends to a depth not substantially greater than the minimum depth required by the function of the gear. The final heat treat also advantageously improves the stress state.

The initial shape of the gear may be produced by either a machining operation or a forging operation.

The final heat treat may be by carburizing, nitriding, or induction hardening.

BRIEF DESCRIPTION OF THE DRAWINGS

FIG. 1 is a block diagram of the steps of a method for forming gears according to the present invention and illustrating alternate steps in parallel paths; and FIGS. 2 and 3 are a block diagrams of two prior art methods of forming gears.

BEST MODE FOR CARRYING OUT THE INVENTION

As used herein the term "gear" is limited to a structure which has teeth that transmit motion by a combination of rolling and sliding actions along the tooth surface. The tooth surface has a profile which includes a root portion and a flank portion along which said actions occur.

The present invention is best understood in light of the prior art. FIG. 2 is taken from the aforementioned U.S. Pat. No. 4,761,867. It discloses a process which includes the following steps: preparing and heating a billet; forging a ring rolling preform; ring rolling a rolled ring forging blank; precision forging a near net gear forging; normalize heat treating 18 (see FIG. 2) which is not required for all alloys; semi-finish machining 20; carburize heat treating 22; finish machining of the center and mounting bores 24; and finish cubic boron nitride grinding of the final gear teeth profiles 26. Thus the finish grinding is performed after the heat treat operation.

FIG. 3 is illustrative of a more generic prior art process for making a gear using machining operations. First a gear blank is given a normalize heat treat 30 and diameters and faces are turned (as on a lathe) 32. Next the teeth are rough cut 34 and then finish cut 36. Sometimes the rough cut step is not necessary. The gear is then heat treated 38 by any conventional method. Unfortunately heat treatment causes distortions in the gear tooth surfaces. Finally the gear tooth surfaces are ground 40 to bring the tooth profile within tolerances.

FIG. 1 illustrates steps of preferred embodiments of the present invention and shows that different preliminary steps may be performed prior to the grinding step and that any of various heat treat operations may be performed after the grinding step. As shown, one may start with a billet (not shown) and forge the gear to near net shape 50 and normalize heat treat 52 to make what is known as a "green gear". As an alternate, for example, a gear blank (not shown) may be subjected to normalize heat treat 54 and have the gear tooth surfaces machined 56 to make a "green gear". As is well known in the art, the normalize heat treat is not required for all alloys. If nitride heat treatment is to be used, then a thermal treatment is usually required to develop core properties. As a further alternate, it is possible to grind the gear from a gear blank without performing the machining step 56.

In accordance with the present invention a grinding step 60 is performed on at least the flank portion of the "green gear" and, if desired, on both the root and flank portions. The grinding step 60 is performed before heat treatment and the tooth profile grinding is done to final dimensions. One advantage of grinding a "green gear" is that it virtually eliminates grinder burn. Another advantage is that the final heat treat can be reduced so that the hardened surface layer extends only to the minimum depth required by the function of the gear, as opposed to that depth plus the amount that would otherwise be removed by a grinding operation performed after heat treat. Preferably this grinding step before heat treat is accomplished by cubic boron nitride (CBN) grinding. Advantages of CBN grinding are increased speeds and feeds thus reducing grinder time, longer grinding wheel life, greater accuracy, and consistent stresses imposed by the grinding wheel. While these advantages are somewhat inherent in CBN grinding, they are magnified by grinding "green gears" before heat treat. The greater accuracy and consistent stresses cooperate with the reduced heat treat requirement to provide minimal heat treat distortion. At the same time the heat treat step improves the imposed stresses in the resulting gear by relieving any stresses resulting from the preceding steps and by imposing beneficial stresses. In the prior art, heat treat relieved the stresses caused by machining prior to heat treat but could not relieve those stresses imposed by grinding after heat treat.

CBN grinding machines are available from several sources. For example, machines for CBN grinding parallel axis gears are available from Kapp GmbH of Germany, Liebherr GmbH of Germany and Kashifuji Ltd. of Japan; machines for CBN grinding bevel gears are available from The Gleason Works of Rochester, N.Y., USA and Klingelnberg of Germany.

As used herein the terms "heat treat" or "heat treatment" are meant to include any known hardening or heat treat process. Referring to FIG. 1, the gear which has its tooth surfaces ground to final dimensions is subjected to a heat treat operation such as carburizing 62, nitriding 64, or induction hardening 66. These heat treat operations are well known to those skilled in the art and further description is deemed unnecessary. However, a particularly advantageous heat treat operation is disclosed in U.S. Pat. No. 4,921,025 issued May 1, 1990 and assigned to the assignee of this application. Its process provides a carburized low silicon steel article characterized by having a carburized surface that, without any material removed therefrom, has carbides on the carburized surface and does not require further finishing. It is deemed apparent that such an article should not be subjected to a grinding operation after heat treatment. Accordingly the present method works well with that heat treat process as well as other heat treat processes where retention of surface heat treat characteristics is required.

INDUSTRIAL APPLICABILITY

The above described method can be used to form any type of gear. For example, it can be applied to both internal and external spur and helical gears, as well as all types of bevel gears and pinions. The manufacturing operation is more streamlined since all cutting and grinding operations on the gear tooth profiles can be performed in one cell, without the necessity of returning the gear to the cell after heat treat. In addition tolerances of the pre-grind tooth shapes are not as critical because the grinding is performed on the "green gear", not on hardened surfaces.

The invention in its broader aspects is not limited to the specific steps shown and described, but departures may be made therefrom within the scope of the accompanying claims without departing from the principles of the invention and without sacrificing its chief advantages.

We claim:

1. A method for producing steel alloy gears comprising the steps of:
    forging the tooth surfaces of a gear to a near net shape in which the forged tooth profile surfaces have excess material requiring subsequent removal;
    grinding the gear's tooth profile surfaces to a final finish shape not requiring further material removal, said grinding being performed by the use of cubic boron nitride grinding to introduce consistent stresses in the gear tooth surfaces;
    subsequently performing a final heat treat to the ground gear to relieve the consistent stresses and impose beneficial stresses in the ground gear; and
    controlling the final heat treat to provide a hardened surface layer extending to a depth not substantially greater than the minimum depth required by the function of the gear;
    whereby the consistent stresses introduced in the grinding step cooperate with the controlled heat treat to provide minimal heat treat distortion.

2. A method for producing gears according to claim 1, including the step of performing a normalize heat treatment on the gear after the forging step and prior to the grinding step.

3. A method for producing gears according to claim 1, wherein the forging step includes forging the tooth surfaces of the gear to a shape in which only its tooth flank surfaces have excess material requiring subsequent removal.

4. A method for producing gears according to claim 1, wherein the forging step includes forging the tooth surfaces of the gear to a shape in which both its tooth root and flank surfaces have excess material requiring subsequent removal.

5. A method for producing steel alloy gears comprising the steps of:
    forging the tooth surfaces of a gear to a near net shape in which the forged tooth profile surfaces have excess material requiring subsequent removal;
    grinding the gear's tooth profile surfaces to a final finish shape not requiring further material removal and introducing consistent stresses in the gear tooth surfaces;
    subsequently performing a final heat treat to the ground gear to relieve the consistent stresses and impose beneficial stresses in the ground gear; and
    controlling the final heat treat to provide a hardened surface layer extending to a depth not substantially greater than the minimum depth required by the function of the gear;
    whereby the consistent stresses introduced in the grinding step cooperate with the controlled heat treat to provide minimal heat treat distortion.

6. A method for producing gears according to claim 5, including the step of performing a normalize heat treatment on the gear after the forging step and prior to the grinding step.

7. A method for producing steel alloy gears as set forth in claim 5, wherein the forging step includes forging the tooth surfaces of the gear to a shape in which only its tooth flank surfaces have excess material requiring subsequent removal.

8. A method for producing steel alloy gears as set forth in claim 5, wherein the forging step includes forging the tooth surfaces of the gear to a shape in which both its tooth root and flank surfaces have excess material requiring subsequent removal.

* * * * *

UNITED STATES PATENT AND TRADEMARK OFFICE
CERTIFICATE OF CORRECTION

PATENT NO. : 5,181,375

DATED : January 26, 1993

INVENTOR(S) : Dan L. Thurman et al.

It is certified that error appears in the above-identified patent and that said Letters Patent is hereby corrected as shown below:

Claim 5, column 4, line 40, after "tooth" delete "profile".

Claim 6, column 4, line 54, after "producing" insert --steel alloy--.

column 4, line 54, after "gears" delete "according to" and substitute --as set forth in-- therefor.

Signed and Sealed this

Sixteenth Day of November, 1993

*Attest:*

BRUCE LEHMAN

*Attesting Officer*     *Commissioner of Patents and Trademarks*